United States Patent [19]
McCullough et al.

[11] 3,862,359
[45] Jan. 21, 1975

[54] INFLATABLE INSPECTION INSTRUMENT

[75] Inventors: Edward E. McCullough, Brigham City; Jimmy Petersen, Tremonton, both of Utah

[73] Assignee: Thiokol Corporation, Bristol, Pa.

[22] Filed: Oct. 9, 1973

[21] Appl. No.: 404,523

[52] U.S. Cl....... 178/7.1, 178/DIG. 1, 178/DIG. 30, 354/63, 356/241
[51] Int. Cl. ......................................... H04n 7/18
[58] Field of Search............... 178/DIG. 1, 7.81, 7.2, 178/DIG. 30, 7.1; 350/11; 356/237, 241; 354/63; 73/167

[56] References Cited
UNITED STATES PATENTS

| | | | |
|---|---|---|---|
| 3,329,059 | 7/1967 | McCormac | 356/241 |
| 3,399,614 | 6/1965 | Fischer | 178/7.81 |
| 3,609,236 | 9/1971 | Hellman | 178/DIG. 1 |
| 3,689,695 | 9/1972 | Rosenfield | 178/7.81 |
| 3,764,736 | 10/1973 | Kosky | 178/DIG. 1 |

Primary Examiner—Howard W. Britton
Assistant Examiner—Michael A. Masinick
Attorney, Agent, or Firm—Edward E. McCullough

[57] ABSTRACT

An inflatable bellows column extensible in only one direction has an observing means fixed to its outer end, anchor means for fastening its base to some stationary object, a source of gas, and valve means for selectively inflating the bellows column or portions thereof, and optionally for operating the observing device. The outer end of the inflatable bellows column may be stiffened by a system of inflatable tubes to provide a stable platform for the observing means, which may be operated and oriented either pneumatically from the same source of gas that inflates the column or electrically.

13 Claims, 9 Drawing Figures

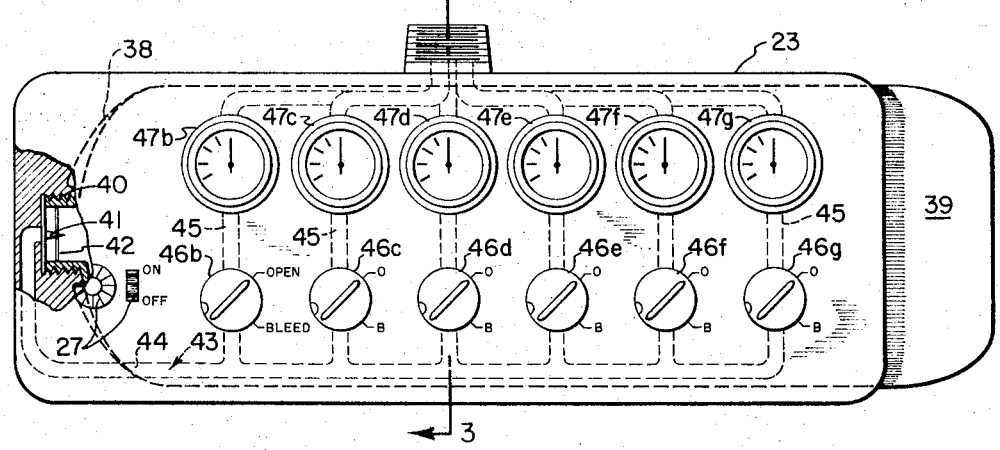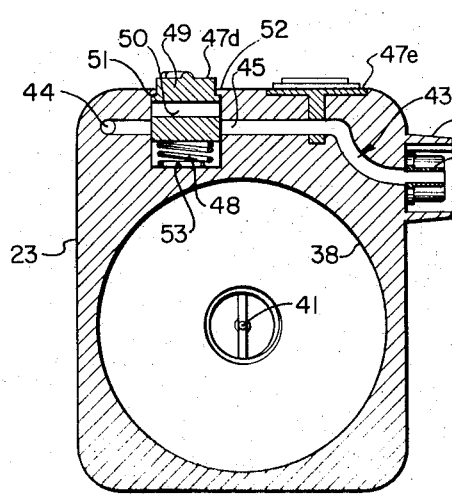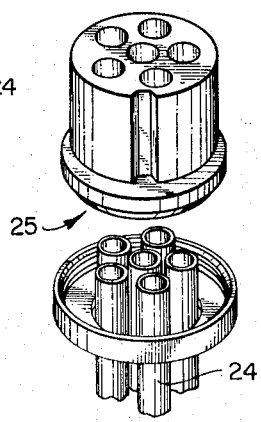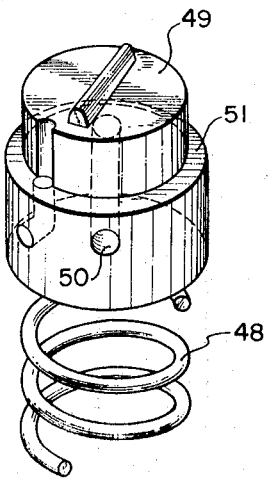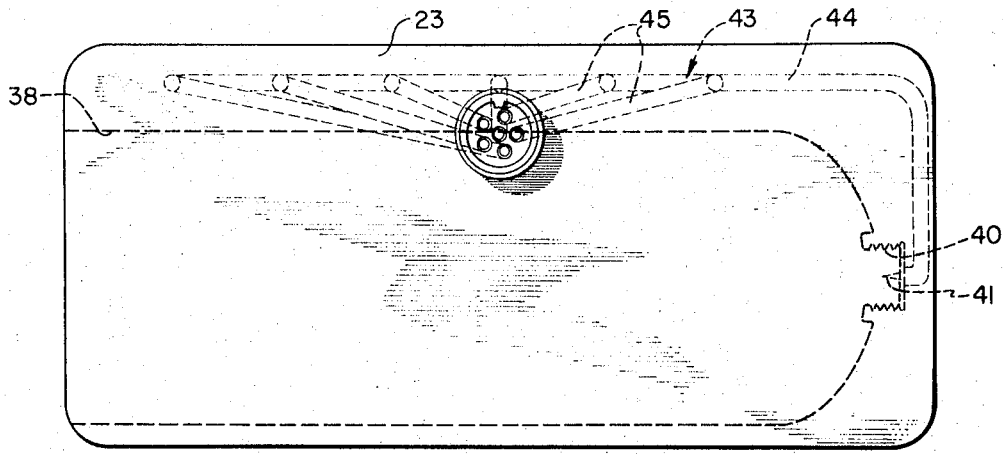

PATENTED JAN 21 1975 3,862,359

INFLATABLE INSPECTION INSTRUMENT

BACKGROUND OF THE INVENTION

This invention relates broadly to inspection devices, and more specifically to those that must be very portable and extensible in one direction for inspecting elongated cavities. The invention herein described was made in the course of or under Contract AF 04(694)-926 with the U.S. Air Force.

Sometimes it is necessary to inspect an elongated cavity wherein the inspection instrument must be very compact and extensible to many times its original length. An example of this is a solid propellant rocket having a central bore in the propellant thereof and a plurality of nozzles. When experimental propellant is used in such a rocket, it must be inspected periodically to assure that undesirable effects, such as cracking, have not occurred as a result of aging. Such an effect must be known, because it can turn a solid propellant rocket into a bomb. Any inspection device that is supported outside such a rocket motor would have to make two substantially 90 degree turns in order to enter the main cavity. Inspection of other solid propellant rocket motors having single nozzles is also usually very difficult without removing the motor from its storage place.

SUMMARY OF THE INVENTION

The present invention, which satisfies this need, is an inspection instrument, the primary element of which is an inflatable bellows column capable of extending many times its collapsed length and in one direction only. An observation device of some kind, such as a television camera, is attached to the outer end of the column on a portion thereof that is made rigid with inflatable ribs. The base end of the bellows column is attached to a long strap whereby the base member and collapsed column may be centered inside the aft closure of a solid propellant motor having a plurality of nozzles and anchored firmly thereto. A supply of gas capable of inflating the column and of operating pneumatic control devices for the observing means may be metered as desired by a control box.

Objects of the invention are to provide an inspection instrument that is very portable and compact, collapsible into a very small package, but capable of extending to a considerable length in one direction. Another object of the invention is to provide such an instrument in which the direction and location of the observing means may be controlled with precision so that a predetermined area of the elongated cavity may be inspected at any given time. Important features of the invention are that it is relatively inexpensive and easy to manufacture of readily available materials. Also, being made primarily of flexible plastic, its surfaces that contact the propellant are soft and easily displaceable so that damage to the propellant is unlikely; and, since the invention is primarily pneumatic in operation, and can be completely so, danger of electric sparking is minimized.

Other objects and features of the invention will become apparent as the following detailed description is read with reference to the accompanying drawings. The same parts are designated with identical numbers through the disclosure.

DESCRIPTION OF THE DRAWINGS

In the drawings:

FIG. 2 is a top view of the control box;

FIG. 3 is a cross section of the control box;

FIG. 4 is a side view of the control box;

FIG. 5 is an exploded view of the pneumatic connector to the control box;

FIG. 6 is an exploded detail view of a valve;

DESCRIPTION OF THE PREFERRED EMBODIMENTS

Figure 1:
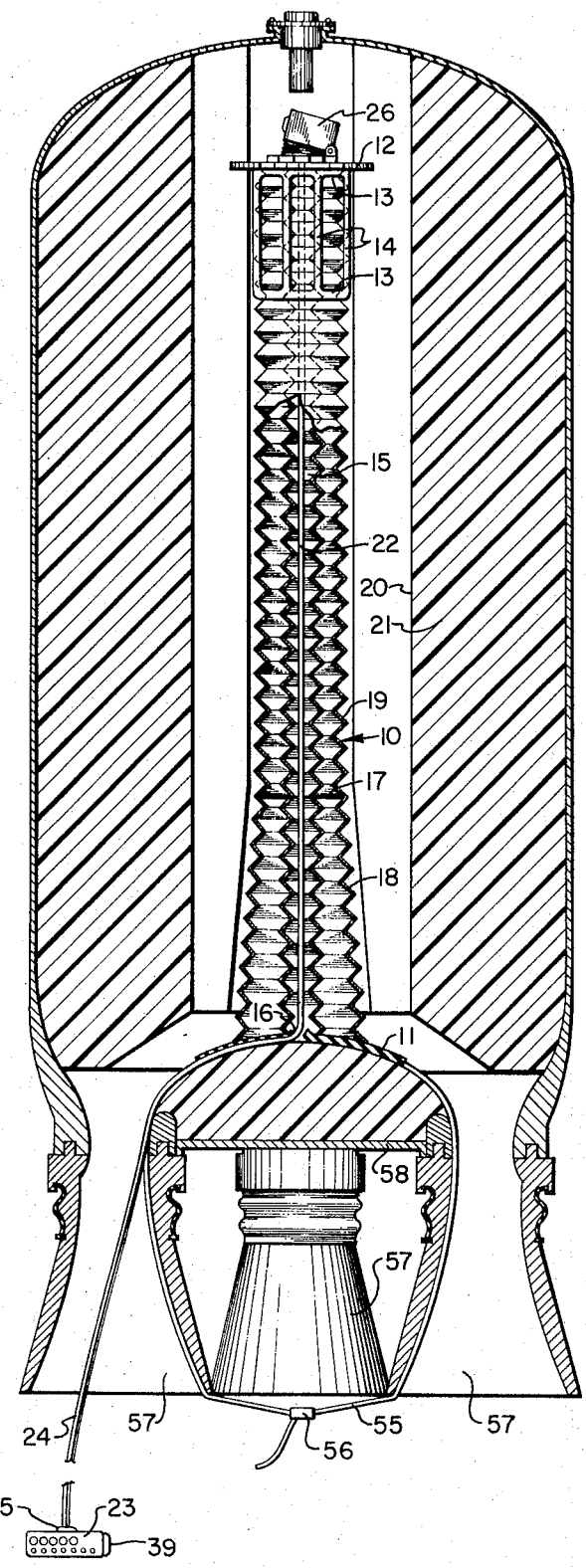
FIG. 1 is a longitudinal section of a typical multiple nozzle, solid propellant rocket motor with the invention installed therein.

An inflatable bellows column 10 has a thin, somewhat flexible disk 11 for its base and a semi-rigid platform 12 on its outer end. This platform 12 may be stabilized by a tandem pair of inflatable annuli 13 connected together by inflatable ribs 14 in sealed relationship with the column 10 to comprise a stiffening device for the platform 12. A central, bellows sleeve 15 seals the edges of a hole 16 in the base 11 and is sealed at its top edge to the platform 12. Hence, the inflatable space in the column 10 is annular. Although in some applications the column 10 may enclose a single chamber, this preferred embodiment has a horizontal partition 17 that divides the column 10 into a conical lower section 18 and a cylindrical upper section 19. This arrangement enables the column 10 to fit the central bore 20 of a specific configuration of propellant grain 21. It is important that lateral space between the column 10 and the walls of the propellant bore 20 be kept to a minimum in the interest of precise observing, since this bore 20 is the only guide and rigid support for the flexible column 10 as it is extended by inflation.

A thin cable 22, surrounded by the sleeve 15, is fastened at one end to a control box 23 and at its other end to the platform 12. The operator can pull this cable 22 to assist in collapsing the column 10 after it has been deflated. This is particularly useful in cases wherein the bore 20 is in a horizontal position. This cable 22 includes a plurality of conductors that furnish power to the observing means and its orienting devices. In this embodiment, the conductors are small pneumatic tubes 24 that extend from a control box connector 25 to the observing means, which is a television camera 26. This cable 22 also includes electrical conductors (not shown) for operating the television camera 26. They extend from the controls 27 of the control box 23 to the camera 26. Other pneumatic tubes, not shown, extend from the control box connector 25 to the interiors of the sections 18 and 19 of the bellows column 10.

Figure 7:
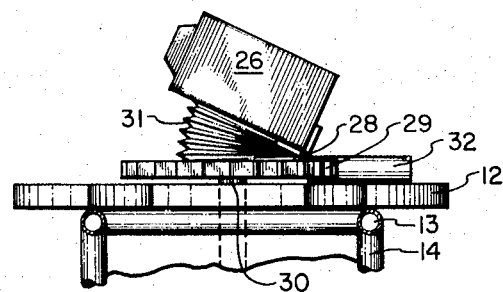
FIG. 7 is a side view of the camera and its vertical adjustment device.
Figure 8:
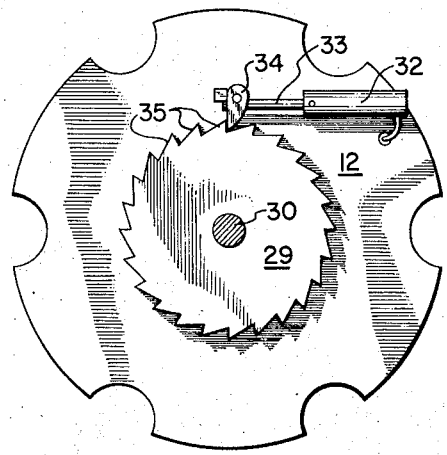
FIG. 8 is a sectional view showing the horizontal, angular adjustment means for the camera.
Figure 9:
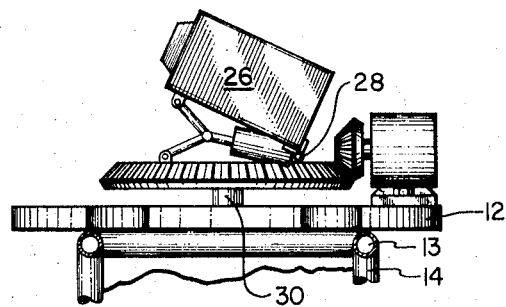
FIG. 9 is a fragmentary, side elevation of the camera and adjacent parts to show a second embodiment of camera orienting devices.

FIGS. 7 and 8 illustrate the details of the camera mounting and its associated mechanisms. The camera 26 is hinged at its lower rear edge by a hinge 28 to a ratchet disk 29, that is pivotally attached at 30 to the platform 12.

The camera 26 may be oriented as desired in a vertical plane by a small camera bellows 31 between the camera 26 and the ratchet disk 29. As the bellows 31 is inflated, it rotates the camera 26 in a vertical plane about the hinge 28, to the extent desired by the operator.

Horizontal orientation of the camera 26 is achieved by a small, double acting (spring loaded) pneumatic actuator 32 having an actuation arm 33 with a spring pawl 34 pivoted to the outer end portion thereof. When the actuation arm 33 is extended, the pawl engages a tooth 35 of the ratchet disk 29 to rotate the camera to the extent desired. When the actuation arm 33 has been fully extended, gas in the actuator 32 is automatically relieved by a small port 36 and the actuation arm 33 is retracted by a spring not shown. As the arm 33 is retracted, a weak spring 37 on the pivoted pawl 34 allows the pawl to slide over the ratchet teeth 35 without disturbing the horizontal position of the camera 26.

The control box 23 is shown in FIGS. 2 through 6. This control box 23 is a body including a receptacle having a cylindrical cavity 38 to receive a bottle 39 of compressed gas such as air, carbon dioxide, or nitrogen. The inner end of the cavity 38 is equipped with the threaded recess 40 and a puncture point 41. As the gas bottle 39 is screwed into threaded engagement with the threaded recess 40, the puncture point 41 punctures a diaphragm seal 42 in the end of the gas bottle 39, allowing gas therefrom to flow into a system of ducts 43 in the upper wall, which provides a control panel of the control box 23. A main duct 44 supplies gas to a plurality of branch ducts 45. Each of the branch ducts 45 leads to the connector 25 that connects to the tubes 24. Between the main duct 44 and the connector 25, each branch duct 45 is interrupted by a stopcock or other valve 46 (b through g) and a flow meter 47 (b through g). Each of these stopcocks 46 is maintained in a normally closed position by a compression spring 48 seated below the valve member 49, which maintains the valve passage 50 in a normally nonaligned position relative to the branch duct 45. A shoulder 51 on the valve member 49 is retained by an annular lip 52 in the valve seat 53. The valve 46 may be turned on by rotating its passage 50 into alignment with the appropriate index mark on the control box 23 and then depressing it into alignment with its branch duct 45.

Each flow meter 47 is individually calibrated to indicate the extent to which its respective device is inflated. For example, when the lower section 18 of the bellows column 10 is half inflated, its flow meter 47 f will indicate that this column is approximately nine feet high. In similar manner, the flow meter 47d will indicate the horizontal orientation of the camera 26 at any given time.

In practice, the bellows column 10 is normally collapsed and the base member 11 is folded upon itself over the bellows column 10 and the camera 26 in the manner of a taco; and its overlapping edges are snapped into place by a snap fastener 54. In this way, the entire instrument can be contained in a very small and easily portable package. This portability of the invention is one of its most important features. One design of the apparatus described is capable of extending about 18 feet into a bore and of being folded into a package about 4½ by 4½ in. by 6 in. in size.

When a multiple nozzle rocket is to be inspected, a strap 55, equipped with an end buckle 56, and fastened intermediately to the base member 11, is passed through two diametrically opposite thrust nozzles 57, until the base member 11 is centered on the inside of the aft closure 58. The buckle 56 is then fastened to the opposite end of the strap 55 so that the base member 11 is held firmly in place. The lower section 18 of the bellows column 10 is then normally inflated to the extent desired by opening the appropriate stopcock 46f. If the operator wishes to lower the camera 26, he may rotate the same stopcock to the "bleed" position until the desired camera location is attained.

The lower section 18 of the bellows column is normally inflated first then the rib and annulus structure 14 and 13 may be inflated by stopcock 46e to provide rigid support for the camera 26. Then additional height of the camera in the propellant cavity may be regulated as desired by inflation of the upper section 19 of the bellows column by the stopcock 46g. In a similar manner, the camera bellows 31 is inflated to produce the desired vertical orientation of the camera and the actuator 32 is energized until the desired horizontal angle thereof has been achieved.

If the observing device is a television camera 26, it may be operated by electrical controls 27, via conductors not shown.

As shown in FIG. 4, vertical angular adjustment of the camera 26 is effected by the valve 46c and the extent of adjustment is read on the flow meter 47c. Valve 46d and flow meter 47d are used in this same way for horizontal angular adjustment of the camera 26; valve 46e and flow meter 47e are used for inflation of the annuli 13 and ribs 14; valve 46f and flow meter 47f are used for inflation of the lower section 18 of the bellows column 10; and valve 46g and flow meter 47g are used for inflation of its upper section 19.

Devices for orienting the camera 26 in horizontal and vertical planes may be electrical step motors 59 and 60, respectively, appropriately attached to move the ratchet disk (or gear) 29 relative to the platform 12 and the camera 26 relative to the ratchet disk 29. These motors 59 and 60, and their connection means to adjacent parts are well known devices. Pneumatic tubes 24 leading to the camera bellows 31 and to the actuator 32 are, in this case, replaced by electrical conductors, not shown.

It may be noted that the central cavity 20 of the propellant grain 21 acts as a guide for the bellows column 10 so that it can move only upward or downward. It is likewise a guide for the annulus and rib structure 13 and 14, which is quite rigid when fully inflated, so that the platform 12 is maintained in a perfectly horizontal orientation relative to the vertical cavity 20.

Although the invention is shown and described herein as being operated in a vertical direction, it is readily apparent that it may also be used to inspect horizontally disposed cavities without any change in operating procedures.

An invention has been described that advances the art of inspecting elongated cavities; and although the embodiment described has been quite specific with regard to details, it should be noted that such details may be altered considerably without departing from the scope of the invention as it is defined in the following claims.

The invention claim is:

1. An instrument for inspecting elongated cavities, comprising:
    a collapsible, inflatable bellows column, extensible in one direction, having an outer end and a base end;

an observing means on the outer end of the bellows column;

a receptacle for receiving a source of gas for inflating the bellows column;

valve means connected between the receptacle and the bellows column for metering gas as desired thereto; and means for controlling the observing means.

2. The instrument of claim 1 further including a stiffening device on the outer end portion of the bellows column, the stiffening device comprising two tandem, inflatable annuli connected together by a plurality of parallel, inflatable ribs, both ribs and annuli being fastened to the bellows column, for stabilizing its position in a cavity to be inspected, the stiffening device being connected to said valve means for inflation as desired.

3. The instrument of claim 1 wherein the bellows column comprises a lower, conical section and an upper cylindrical section connected thereto, and further includes a partition that seals these sections from one another, each section being connected to the valve means for inflation as desired.

4. The instrument of claim 1 wherein the base end of the bellows column is a flexible disk extending beyond the diameter of the column, and further including fastening means on diametrically opposite edges, so that it may be folded upon itself to enclose the collapsed bellows column and observing means and fastened to form a portable package.

5. The instrument of claim 1 further including a strap fastened intermediately to the base end of the bellows column and means for fastening the ends of the strap together.

6. The instrument of claim 1 wherein the observing means is a television camera.

7. The instrument of claim 6 further including:

a ratchet disk centrally pivoted to the outer end of the bellows column and hinged to the camera at the lower, rear edge thereof;

an inflatable camera bellows between the camera and the ratchet disk for orienting the camera in an axial plane relative to the bellows column;

a double acting, pneumatic actuator having an actuating arm and a spring pawl pivoted thereto, the actuator being attached to the outer end of the bellows column adjacent the ratchet disk so that the pawl may engage ratchet teeth thereof when the actuating arm is extended, whereby the camera may be oriented as desired in a plane perpendicular to the axis of the column; and tubes connecting the camera bellows and actuator to the valve means, whereby each may be inflated to the extent desired for orienting the camera.

8. The instrument of claim 1 further including a control panel to house the valve means and the control means; and conductors extending from these valve and control means to the bellows column and observing means for operation thereof.

9. The instrument of claim 8 wherein the conductors for operating the observing means comprise a plurality of pneumatic tubes forming a single cable that passes axially through the bellows column and attaches to the outer end thereof, and further including a bellows sleeve surrounding the cable in the bellows column sealing the column at both ends to form an annular inflatable space in the column around the cable, whereby the cable may also be used to help collapse the column when deflated.

10. The instrument of claim 9 including electrical stop motors attaching the observing means to the bellows column for orienting the observing means as desired, and wherein the conductors to these motors and other controls for operating the observing means are electrical conductors.

11. The instrument of claim 8 wherein the control panel is in one wall of a body having a cavity, open at one end to receive a bottle of compressed gas and equipped at the inner end with a threaded recess to receive a threaded end of the bottle; and further including a puncture point in the recess for puncturing a diaphragm seal in the threaded end of the bottle, for releasing gas therefrom, said panel wall having a system of ducts that extend from the puncture point to the conductors that connect to the bellows column and observing means.

12. The instrument of claim 11 wherein at least some conductors to the observing means and to the bellows column are pneumatic tubes, and wherein the valve means is a stopcock that interrupts the duct that connects to each of these tubes, the stopcock being capable of closing and opening the duct and of bleeding gas from the portion thereof that is connected to a conductor; and further including a flow meter in each duct between the stopcock and the connector for indicating the extent to which the connected mechanisms are pressurized.

13. An instrument for inspecting elongated cavities comprising:

a bellows column having a base end, an outer end, and a central bellows sleeve sealed at each end to the corresponding end of the column so that the inflatable space in the column is annular;

a television camera on the outer end of the column for observing the cavity;

a mechanism for orienting the camera in a plane perpendicular to the axis of the column comprising a ratchet disk hinged to the lower rear edge of the camera and centrally pivoted to the outer end of the column, and a pneumatic actuator fixed to the outer end of the column adjacent the ratchet disk and having an actuating arm with a spring pawl on the end thereof for engaging the ratchet teeth, whereby the ratchet disk may be rotated;

an inflatable bellows between the camera and the ratchet disk, whereby the camera may be oriented in an axial plane;

a control box having a cavity therein to receive a bottle of compressed gas, the inner end of the cavity forming a threaded recess for engagement with a threaded gas bottle, a puncture point in the threaded recess to rupture a diaphragm seal of a gas bottle, the control box having a system of ducts in one wall thereof connected to the puncture point so that gas released thereby may flow into the ducts; and a control panel comprising the side of the control box that contains the ducts, including a stopcock in each duct that supplies gas to a pneumatic device and a flow meter connected in tandem therewith by the duct; and conductors in the form of pneumatic tubes connecting the ducts to the pneumatic devices and electrical conductors connecting the electrical controls to electrical devices, wherein all conductors, except those for inflating the bellows column, form a single cable attached at one end portion to the outer end of the bellows column, whereby it may be used to assist in collapsing the deflated column.

* * * * *